United States Patent
O'Neill et al.

(10) Patent No.: US 6,558,584 B1
(45) Date of Patent: *May 6, 2003

(54) APPARATUS AND METHOD FOR HANDLING AN OPHTHALMIC LENS

(75) Inventors: Trevor O'Neill, Waterford (IR); Thomas Stevenson, West Lothian (GB); Anthony LaRuffa, Rochester, NY (US); Ted Foos, Rochester, NY (US); Ger Reynolds, Wexford (IR)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/540,250

(22) Filed: Mar. 31, 2000

(51) Int. Cl.⁷ .......................... B29D 11/00; B65B 61/22
(52) U.S. Cl. ........................... 264/1.1; 53/431; 53/247; 425/808; 264/2.6
(58) Field of Search ................... 264/1.1, 2.6; 425/808; 53/431, 467, 247; 206/5, 5.1

(56) References Cited

U.S. PATENT DOCUMENTS

| | | | |
|---|---|---|---|
| 4,909,969 A | * | 3/1990 | Wood |
| 5,466,147 A | * | 11/1995 | Appleton et al. |
| 5,561,970 A | | 10/1996 | Edie .............................. 53/473 |
| 5,693,268 A | * | 12/1997 | Widman et al. |
| 6,207,086 B1 | * | 3/2001 | Schlagel et al. .............. 264/2.6 |
| 6,347,870 B1 | * | 2/2002 | LaRufa ........................ 264/2.6 |

FOREIGN PATENT DOCUMENTS

| EP | 0227365 A2 | 7/1987 | .......... B29D/11/00 |
|---|---|---|---|
| EP | 0637490 A1 | 2/1995 | .......... B29C/35/08 |
| EP | 0686487 A2 | 12/1995 | .......... B29D/11/00 |
| EP | 0686490 A2 | 12/1995 | .......... B29D/11/00 |
| FR | 2756550 | 6/1998 | .......... B65G/57/04 |
| WO | 93/04834 | 3/1993 | .......... B29C/33/62 |
| WO | 93/04848 | 3/1993 | .......... B29D/11/00 |
| WO | 98/19854 | 5/1998 | .......... B29D/11/00 |

* cited by examiner

Primary Examiner—Mathieu D. Vargot
(74) Attorney, Agent, or Firm—Katherine McGuire

(57) ABSTRACT

Apparatus and method for handling an ophthalmic lens in a manufacturing line where lenses are presented for picking and transport to a respective lens receptacle. The problem of lens fly-away is prevented by a cover which releasably couples to the lens picking means and is deposited over the lens receptacle immediately following release of the lens into the secondary receptacle and withdrawal of the lens picking means.

24 Claims, 16 Drawing Sheets

APPARATUS AND METHOD FOR HANDLING AN OPHTHALMIC LENS

BACKGROUND OF THE INVENTION

The present invention generally relates to industrial automated material handling. More particularly, the present invention relates to an automated apparatus and method for releasing and handling a contact lens from a contact lens mold following formation of a contact lens therein. The invention is also applicable to other types of ophthalmic lenses, for example, spectacle and intraocular lenses.

Static cast molding of contact lenses is known. See, for example, U.S. Pat. No. 5,466,147 issued to Bausch & Lomb Incorporated, the entire reference of which is incorporated herein by reference. A single mold unit comprises a female mold section having a concave optical surface and a male mold section having a convex optical surface. The female and male mold sections are complimentary shaped and mateable to form a lens-molding cavity between the facing concave and convex optical surfaces of the female and male mold sections, respectively.

The basic process for cast molding a lens is as follows. A quantity of liquid lens material (monomer) is dispensed into the concave optical surface of the female mold section and the male mold section is seated upon the female mold section with the concave and convex surfaces thereof facing one another to form a lens-shaped mold cavity. The joined female and male mold sections form a single mold unit which is subject to a curing cycle (e.g., by thermal or UV radiation) thereby causing polymerization of the lens material in the mold cavity. Once the lens material has cured, the male and female mold sections must be separated to retrieve the cured lens.

The opening or release of the mold sections must be carried out in a manner which will not harm the delicate lens. Once the lens has polymerized in the mold cavity, the lens and any lens flash will have an adhesive bond to the opposite concave and convex mold surfaces. Thus, the release of the male mold section from the female mold section must be of a force strong enough to break the adhesive bond of the lens and lens flash to the opposing mold surfaces, yet not so strong or haphazard that the optical surfaces of the lens are harmed by the release process. Should the lens crack or be otherwise damaged during the mold release process, the lens must be scrapped, thereby lowering the output yield and increasing manufacturing costs.

An example of a mold release apparatus and method may be seen in PCT Published Application WO98/19854 which is assigned to Bausch & Lomb Incorporated, the present assignee herein and the entire disclosure of which is incorporated herein by reference. Another example of prior art methods of mechanical mold release include prying off of the male mold section from the female mold section by applying a lever-type mechanism between the two mold sections. See, for example, U.S. Pat. No. 5,693,268 issued to Johnson & Johnson Vision Products, Inc. which discloses an elongated wedge applied at opposite sides of the mold between the outer flanges of the male and female mold sections. The mold unit and wedge are translated relative to each other which gradually pries the male mold section from the female mold section.

Once the mold sections have been separated, the lens must be released from the mold section on which it is retained. Both wet and dry release methods of lens release have been proposed in the prior art. In wet lens release methods, an aqueous solution is used to wet the hydrophilic lens which thereby absorbs water and swells, causing the lens to separate from the mold surface. This method may also be used in the mold release procedure. In dry lens release methods, a force is applied to break the bond between the lens and mold surface. For example, the above-mentioned '268 patent discloses that application of a thermal gradient between the male mold half and the lens contained therein may be used to assist in separating the lens from the mold. Other similar prior art methods are disclosed in the '268 patent, and those references are hereby incorporated herein by reference.

Detaching a lens from a mold by deforming the mold body relative to the lens is seen in U.S. Pat. No. 4,909,969 issued to Wood. In this method, the mold body is compressed by using successively smaller diameter plungers which engage the interior of the mold resulting in a compressive force being applied to the mold wall. Permanent deformation of the mold body results with the lens ultimately detaching therefrom. A similar result can be accomplished by application of a pinching or squeezing force to the mold body. In the case of a male and female mold unit, the squeezing force is applied to one or both mold sections which deforms the mold, thereby assisting in release of the female from the male mold section.

Another factor to consider is how well the proposed mold release apparatus and method performs in a high speed automation environment, a very critical cost-to-manufacture consideration in today's highly competitive contact lens industry. In many of the above prior art methods, the ability to consistently control the release operation degrades once applied to a high speed automated manufacturing line.

Yet another consideration is lens handling. Since contact lenses are extremely delicate, small articles of manufacture having precise optical surfaces, they must be handled with extreme care so as to not damage the lens and increase costs to the manufacturing operation. It is thus an object of a contact lens automation line to use a contact lens handling system which keeps the lenses from having to be directly touched by the handling machinery. In the case where the lenses must be transferred from the mold in which they were formed to a separate package for downstream processes (e.g., hydration) or for final packaging to the consumer (e.g., transfer to a blister package), the lenses must undergo some amount of handling to effectuate this transfer process. In prior art methods, lenses have been transferred manually by an operator using a pair of tweezers to grasp the lens and transfer it from the mold to a package receptacle. This, of course, is an extremely labor intensive method of lens handling and also creates a high chance of lens damage caused by the direct contact with the tweezers and the operator's inability to consistently control the amount of force used with the tweezers when handling a lens therewith.

When transfer of the lens to a separate container is required as discussed above, it may be preferred to perform a dry lens release from the mold since the lens may be easier to handle in a manufacturing line when in a dry state as opposed to a wet state. This is since in the wet state of a soft contact lens, the lens is very flexible and prone to sticking and folding which could cause difficulties with the handling apparatus.

Once released from its associated mold surface, a dry lens is also prone to a problem known in the industry as "flyaway". This is the phenomenon of a dry lens being displaced from its intended location due to air currents and/or electric charges surrounding the manufacturing line. Such air currents can develop by the moving parts of the machinery and/or workers moving about the automation line, for example. Further, static electricity is typically generated by the automation equipment in the manufacturing line. The lens fly-away problem creates an increase of "no lens" situations in the receptacle in which the lens was intended to be placed, thus increasing down time and manufacturing costs to detect and correct "no lens" occurrences.

There thus remains a need for an apparatus and method for dry releasing a contact lens from its associated mold section and which substantially eliminates fly-away lenses during handling, and which is capable of robust, consistent performance in a high speed, automated manufacturing environment.

SUMMARY OF THE INVENTION

The present invention addresses the problems of prior art dry lens release methods and apparatus by providing in a first aspect an apparatus and method for dry releasing a contact lens from its associated mold section in a manner which is non-destructive to the lens, and which is capable of high speed automation in a manufacturing line. In a second aspect, the invention provides an apparatus and method for transferring a dry contact lens from its associated mold section to a separate receptacle which is not only non-destructive to the lens, but also prevents the phenomenon of unintentional lens displacement (hereinafter "fly-away").

More particularly, the present invention comprises an in-line manufacturing cell which is operable to accept an array of individual contact lens mold sections each containing a cured lens therein, release the lens from its associated mold section, and lift and transfer the lens to a separate receptacle in a manner which positively captures the lens in the receptacle, thereby substantially eliminating the chance of lens fly-away.

Thus, prior to entering the lens release and transfer cell, the mold units have been subjected to a curing process to cure the lens material, and the female and male mold units have been separated to reveal the lens which is retained on one of the mold surfaces. In the preferred embodiment of the invention, the lens is retained in the female (concave optical molding surface) mold section. Preferentially retaining a lens in a desired mold section is known in the art, and may be accomplished by a variety of methods, including, for example, the mold configuration and geometry of the respective surfaces; electrochemical or other surface treatments to one of the mold surfaces; and/or using different materials to make the male and female mold sections, thereby causing one mold section to have a greater affinity to the lens material as compared to the other mold section.

A predetermined number of mold sections with lenses retained therein are positioned on a mold pallet or other suitable support which positions the mold units in a predetermined array on the pallet. The pallet is advanced into the lens release and transfer cell which transports the pallet with mold sections thereon to a lens release station within the cell. At the lens release station, a pin is operable to rise from beneath a respective mold section and engage the surface of the mold section opposite the optical surface containing the lens. A predetermined force is applied to the mold section by the pin which thereby acts to slightly deform the mold surface which breaks the adhesive force between the optical molding surface and the lens.

Prior to the pin releasing the lens from the mold section, a vacuum head is lowered over the pallet which has previously picked up a pallet cover which is releasably coupled to the vacuum head unit. As soon as the lens is released from the mold surface by the pin acting from beneath the pallet, the vacuum head is activated to pick the lens up and out of the mold section. The vacuum head transports the lens together with the pallet cover to a second pallet which holds a receptacle for each lens. In the preferred embodiment, the receptacle is a blister package having a concave well into which the lens is placed for hydration and final packaging.

With the vacuum head aligned over a respective receptacle, the vacuum is released and the lens is deposited into the receptacle of the second pallet. The vacuum head is then raised, leaving the pallet cover on top of the second pallet. The hole in the pallet cover through which the vacuum head extends is of a diameter large enough to permit insertion and withdrawal of the vacuum head, yet small enough to prevent passage of the lens therethrough. In this way, the pallet cover operates to confine the lens within its respective receptacle, thereby preventing the problem of lens fly-away.

DETAILED DESCRIPTION

The invention will be described and illustrated herein relative to but one of many possible embodiments of the invention. It is therefore understood that various parts of the invention as described herein may vary depending upon the specific lens molding operation employed. For example, changes may be made to accommodate a particular mold configuration being utilized, a particular upstream process such as the curing method, and/or particular downstream processes such as lens hydration and packaging, for example.

Figure 1A:
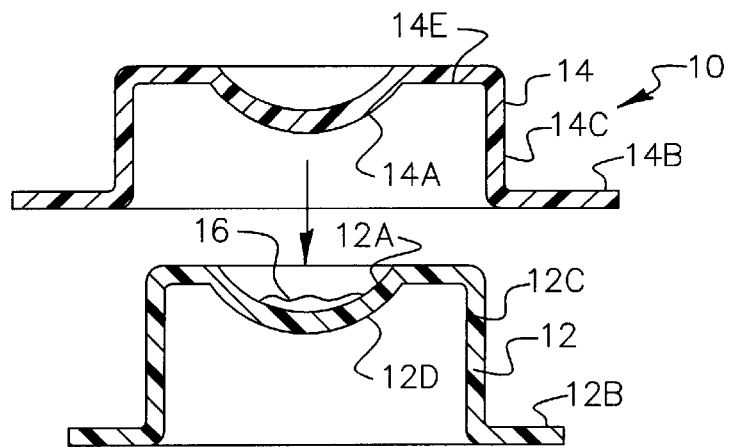
FIG. 1A is a cross-sectional view of a de-coupled mold unit comprising a male mold section shown spaced above a complimentary female mold section.
Figure 1B:
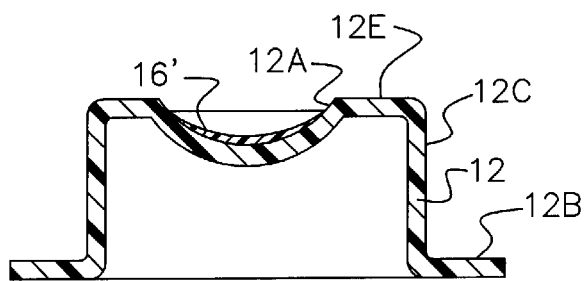
FIG. 1B is a cross-sectional view of the female mold section showing a molded lens retained on the concave surface of the mold section.
Figure 2:
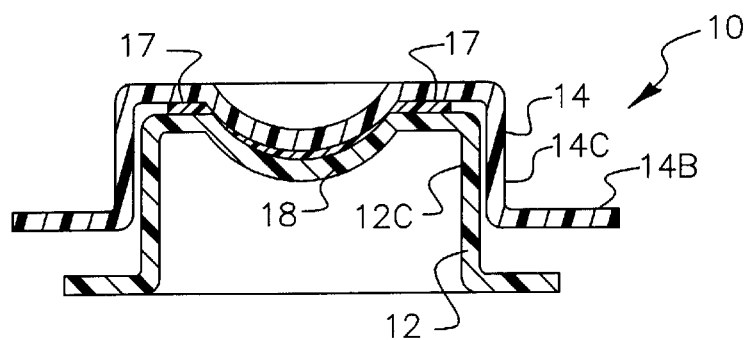
FIG. 2 is the view of FIG. 1A, except the male and female mold sections are joined in the intended manner.

Referring now to the drawing, there is seen in FIGS. 1 and 2 a prior art contact lens mold unit 10 having a female mold section 12 and a complimentary male mold section 14 having respective concave and convex optical molding surfaces 12a, 14a. To mold a lens, a quantity of liquid lens material 16 (e.g., monomer) is dispensed into the female mold section and the male mold section is seated upon the female mold section which creates a lens-shaped mold cavity 18 defined by the facing optical mold surfaces 12a, 14a (see FIG. 2). Each mold section 12,14 includes a respective annular wall section 12C,14C which allows a sliding piston/cylinder type action as the male mold section 14 is seated upon the female mold section 12. Each mold section further includes an annular flat section 12E,14E extending radially outwardly of the associated mold surface 12A,14A, meeting associated annular wall portions 12C, 14C at the outer perimeter of the annular flat section 12E,14E, respectively. Each mold section 12,14 further includes an annular flange 12B,14B extending radially outwardly of associated annular wall sections 12C,14C.

The mold sections 12, 14 are typically injected molded using polypropylene, polystyrene or polyvinylchloride, for example, and are used only once to a mold a single lens due to degradation of the optical surfaces thereof after molding of a lens therein. The quantity of monomer 16 dispensed in female mold section 12 is sufficient to permit a slight overflow of the monomer upon seating the male mold section 14 thereon which ensures a complete fill of the cavity to the periphery where the lens edge will form. Upon fully seating the male section upon the female section, the excess monomer flows radially outwardly of the mold cavity 18. Upon curing, this excess monomer forms an annular flash ring 17 between annular flat sections 12E, 14E, commonly referred to as a "monomer ring" in the art.

Thus, once a mold unit 10 has been filled and capped as seen in FIG. 2, it is subjected to a curing cycle which polymerizes the monomer inside the mold cavity 18. Typical contact lens curing methods include UV radiation and/or thermal (e.g., oven) curing. An accurate cure profile, whether using UV and/or thermal means to effectuate the cure, is determinable according to the mold and monomer type by those skilled in the art, and may also be determined by trial and error without undue experimentation. Once curing is complete, the male mold section 14 is separated from the female mold section 12 to reveal the lens 16' which has formed therein (FIG. 1B). The mold release process must break the adhesive bond between the mold sections, yet not damage the lens which remains on one of the mold surfaces. Suitable mold release processes are mentioned in the Background of the Invention. In the preferred embodiment described and illustrated herein, the lens 16' remains on the female concave optical surface 12A at mold release as seen in FIG. 1B, and the lens flash 17 remains with the associated male mold section 14 (not separately shown), although this may vary depending on the specific mold configurations being used as desired. Thus, immediately following mold release, the lens 16' remains bonded to female mold surface 12a and is in the dry, rigid state (i.e., it has not yet been hydrated).

In a first aspect, the present invention provides an apparatus and method for releasing a cured lens in the dry state from the mold section in which it is adhered following mold release.

In a second aspect of the invention, the present invention provides an apparatus and method for retrieving the loosened lens from the mold section and transferring the lens to a receptacle in a manner substantially preventing the problem of lens fly-away.

In yet a third aspect, the present invention provides an apparatus and method for inverting a pallet in which the mold sections are held so that the lenses are in a face-up position in their respective mold sections immediately prior to the lens release operation.

Figure 3:
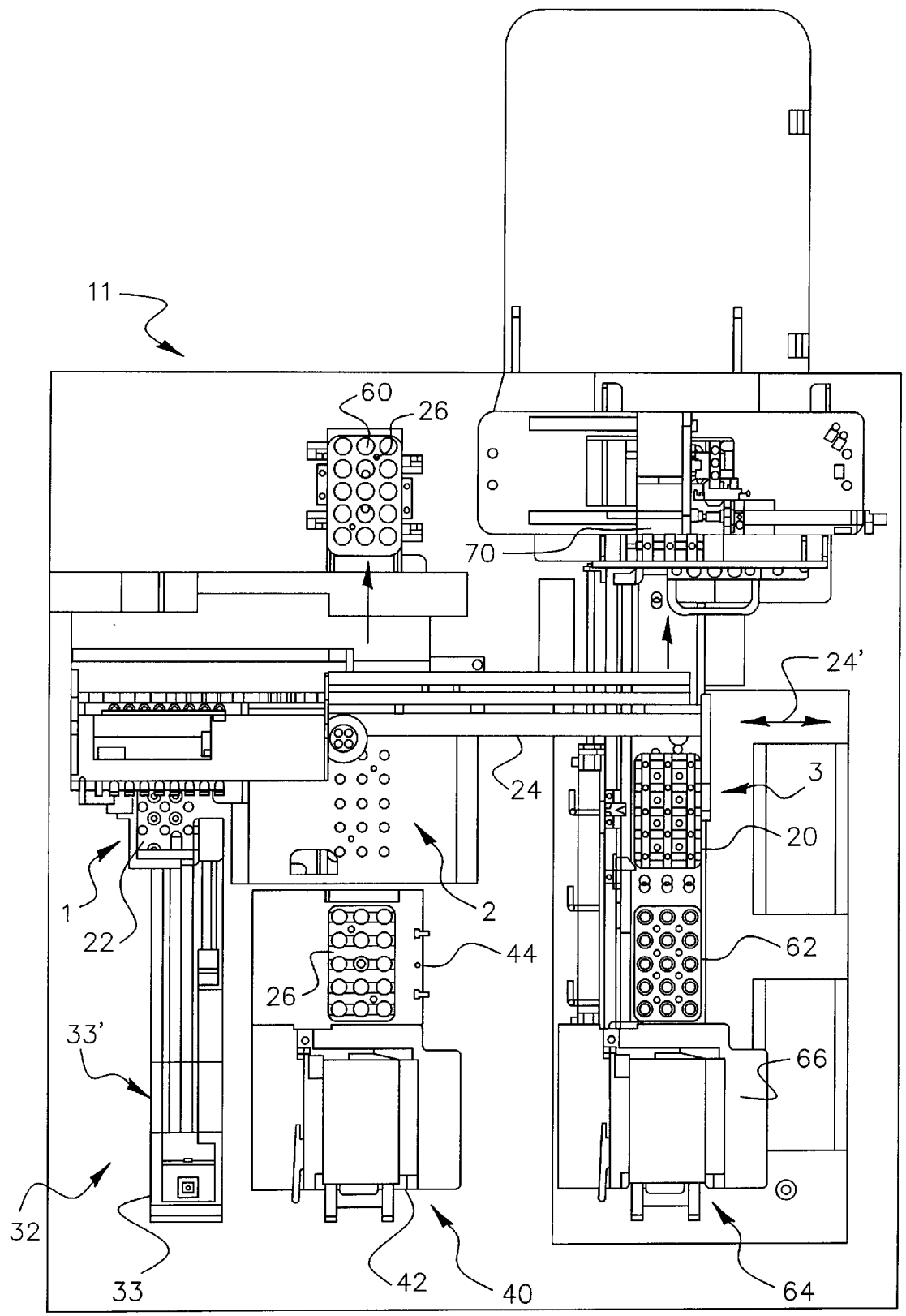
FIG. 3 is a plan view of the lens release and transfer cell according to a preferred embodiment of the invention.
Figure 9A:
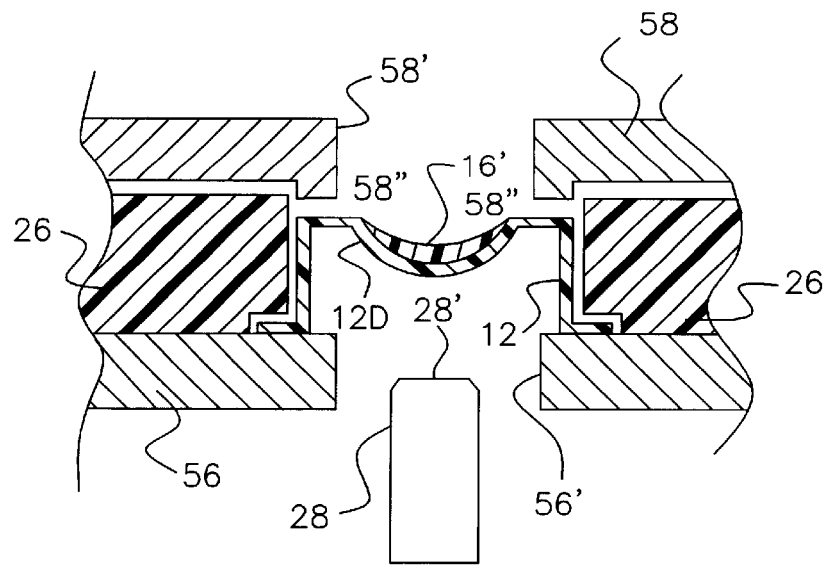
FIGS. 9A–C are fragmented, side elevational, cross-sectional views through a single vacuum head and pin showing the sequential process steps of the lens release and pickup station.
Figure 9B:
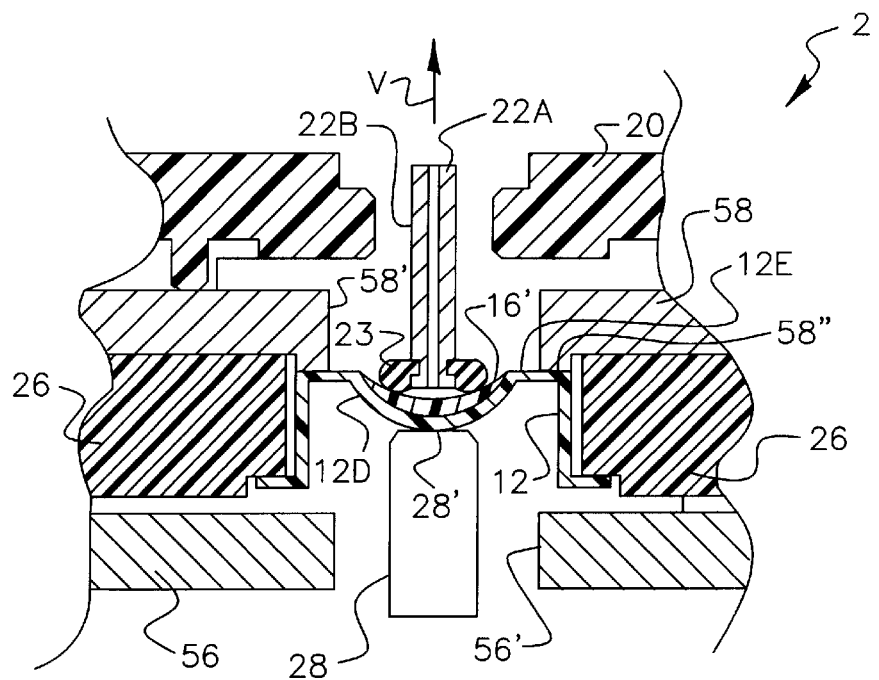
Figure 9C:
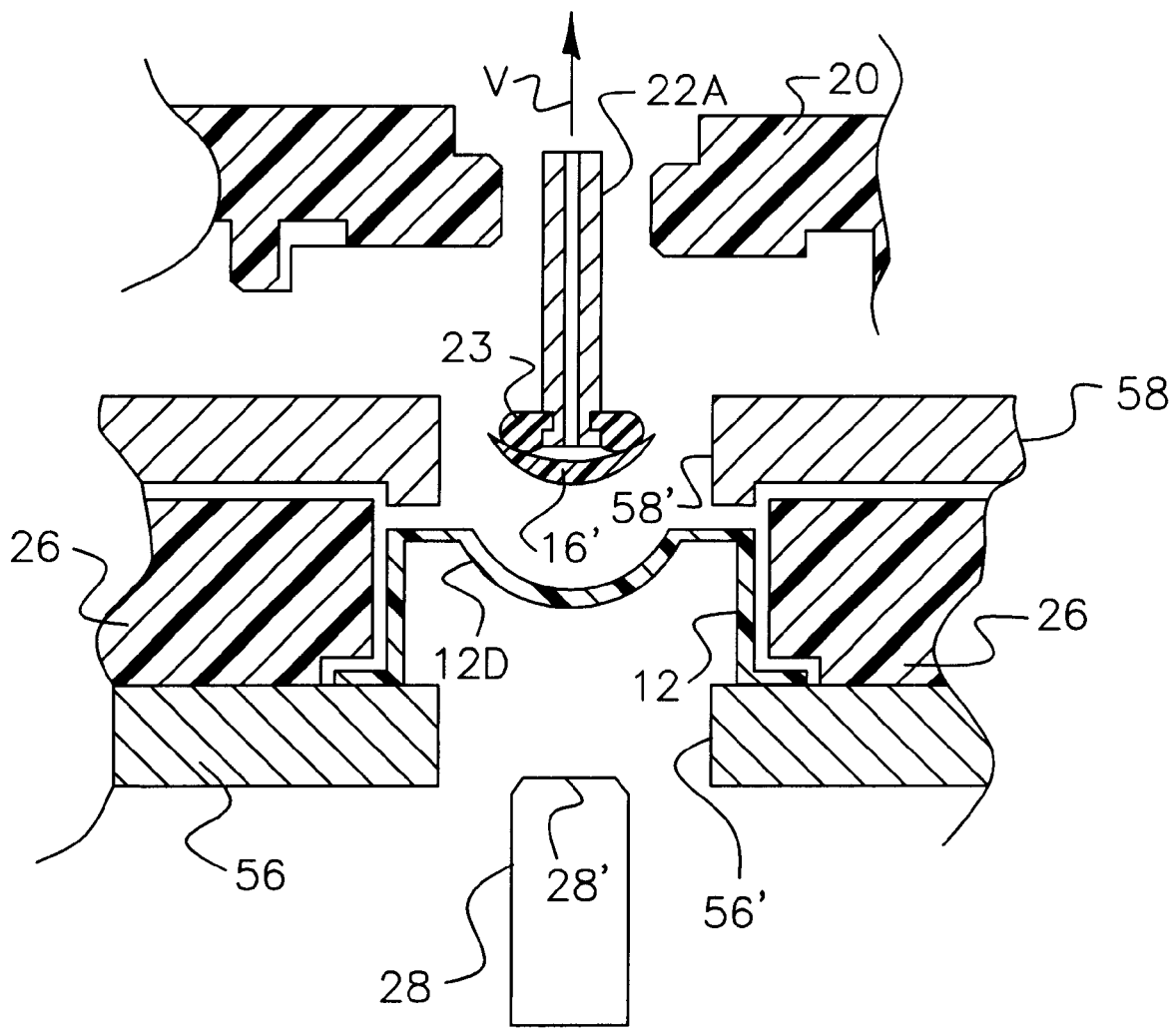

FIG. 3 illustrates a plan view of a preferred embodiment of the invention which comprises a manufacturing cell 11 for performing a dry lens release and transfer of the lens to a secondary receptacle, for example a disposable package in which the lens is packaged for shipping to the consumer. For ease of description, cell 11 will be described herein as having three primary stations; stations 1, 2 and 3. Generally speaking, at station 1, a pallet cover 20 is presented for pick-up by the pick-and-place unit 22 which travels back and forth along overhead rail 24 in the direction indicated by arrow 24'. Pick-and-place unit 22, together with the pallet cover 20, then travel to station 2 where an array of female mold sections 12 having respective lenses 16' adhered thereto are presented lens-side-up on a mold pallet 26. An array of pins 28 are positioned beneath mold pallet 26 and are operable to rise and engage the non-optical convex surface 12D of a respective mold section 12 (FIGS. 9A–C). At the same time, the pick-and-place unit 22 lowers to engage the lens 16' with a vacuum head 22A as lens 16' is being released by the action of pin 28. The pick-and-place unit 22 then travels along rail 24 to station 3 where the lens 16' is deposited into a respective receptacle while also positioning a pallet cover 20 thereover in a manner which confines the lens 16' to its receptacle, thereby preventing lens fly-away. The lenses, together with the receptacle and pallet cover, may then exit the cell for further downline processing as necessary (e.g., lens hydration, extraction, sterilizing, inspection, etc.).

Discussion is now turned to more detailed aspects of the preferred embodiment of the lens release and transfer cell. As seen in FIGS. 3 and 4, a plurality of pallet covers 20 are presented for input into the cell 11 at location 32. The purpose of the pallet cover 20 is generally two-fold: first, cover 20 acts to positively capture a lens in an associated receptacle 30 so as to substantially prevent the problem of lens fly-away; and secondly, cover 20 provides part of the stacked unit in which the lenses are hydrated (see FIGS. 11A and 11B). A preferred configuration of pallet cover 20 is also seen in FIGS. 7A–7D in which a plurality of generally circular depressions 21 are provided in a 3×5 array, although the number and shape of the depressions may of course vary as required (i.e., the number and shape of the depressions will generally correspond to the number and shape of the receptacles 30 utilized). The depressions 21 may be further configured to include a central opening 21A and connecting grooves 21B which allow for efficient water flow through the depressions which hold the lenses during hydration.

Figure 4A:
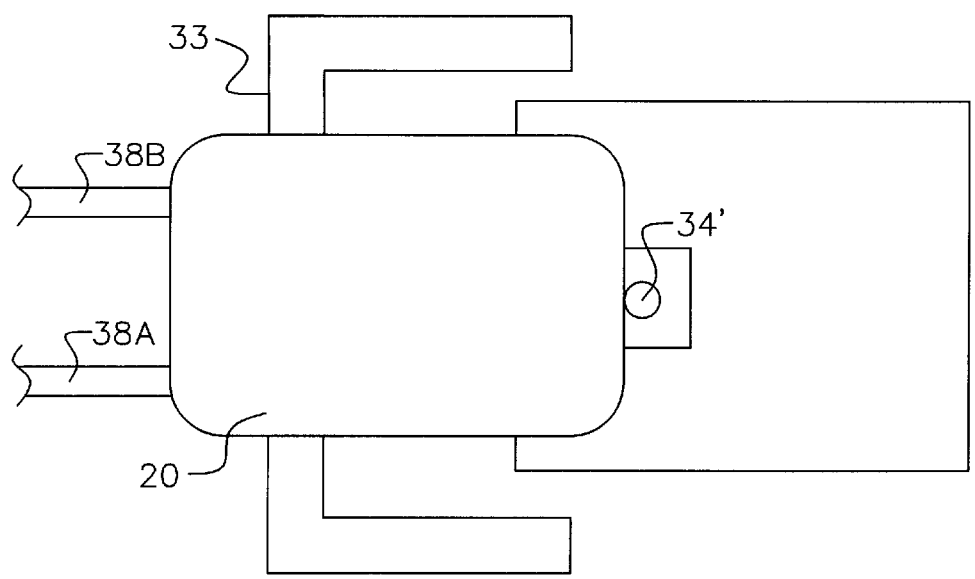
FIGS. 4A and 4B are top plan and side elevational views, respectively, of the input magazine for the pallet covers.
Figure 4B:
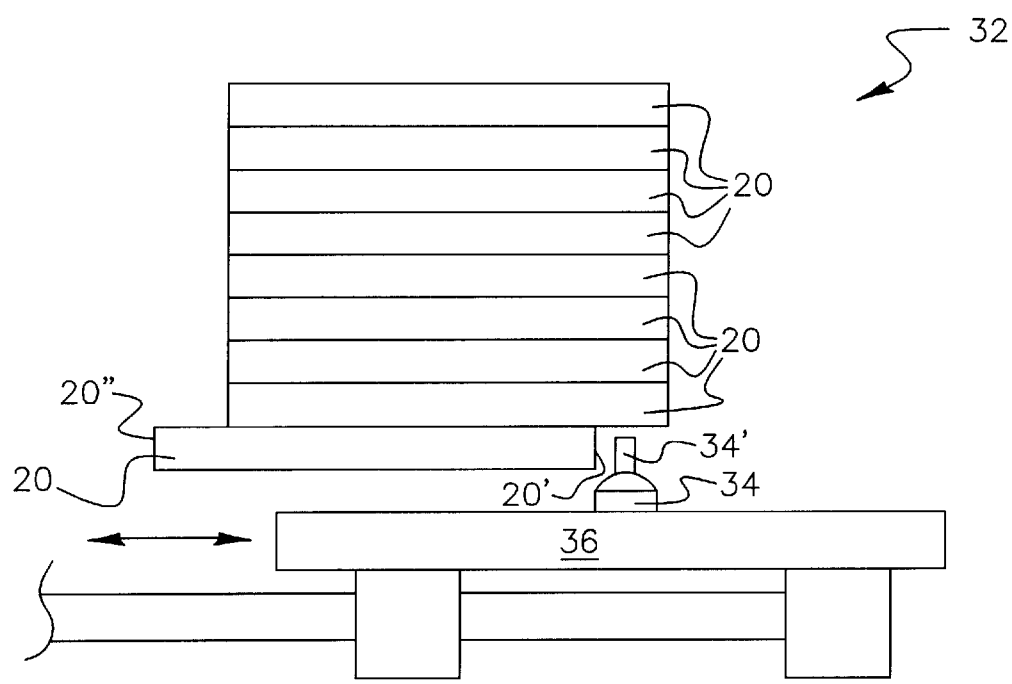

Thus, a plurality of pallet covers 20 are input into cell 11 at location 32. The pallet covers 20 may be stacked and provided in a magazine 33 for dispensing the covers 20, one at a time, into the cell 11. A suitable dispensing mechanism may take the form of a pin 34 which includes a retractable pin head 34' and is attached to a linear actuator 36. A proximity sensor (not shown) positioned adjacent the output side 33' of the magazine 33 sends a signal to the computer controls (not shown) which actuates pin 34 to extend pin head 34' at a location adjacent the trailing edge 20' of the bottom-most cover 20 in the magazine 33 (FIGS. 4A and 4B). At about the same time, the computer activates linear actuator 36 to execute a forward stroke toward station 1 of the cell 11. Once the actuator and pin have executed a full forward stroke, the cover 20 has been cleared of magazine 33 and the actuator and pin are retracted to the home position ready to dispense the next cover 20 in the magazine 33. Upon the return stroke, the pin head 34' is retracted so as to stay clear of the covers 20 in the magazine during the return stroke. Once the proximity sensor is again activated by the absence of a cover 20, pin head 34' will extend and actuator 36 will advance to push the next cover 20 from the magazine 33.

The covers 20 proceed to station 1 where pick-and-place unit 22 travels to sequentially engage and lift covers 20, one at a time, from station 1. Suitable transport means may take the form of a pair of parallel guide rails 38A,B (FIG. 4A) along which covers 20 may travel to station 1 by linear actuator 36, although other known transport means may be utilized, e.g., a conveyor system could be used to transport covers 20 from magazine 33 to station 1.

Figure 8A:
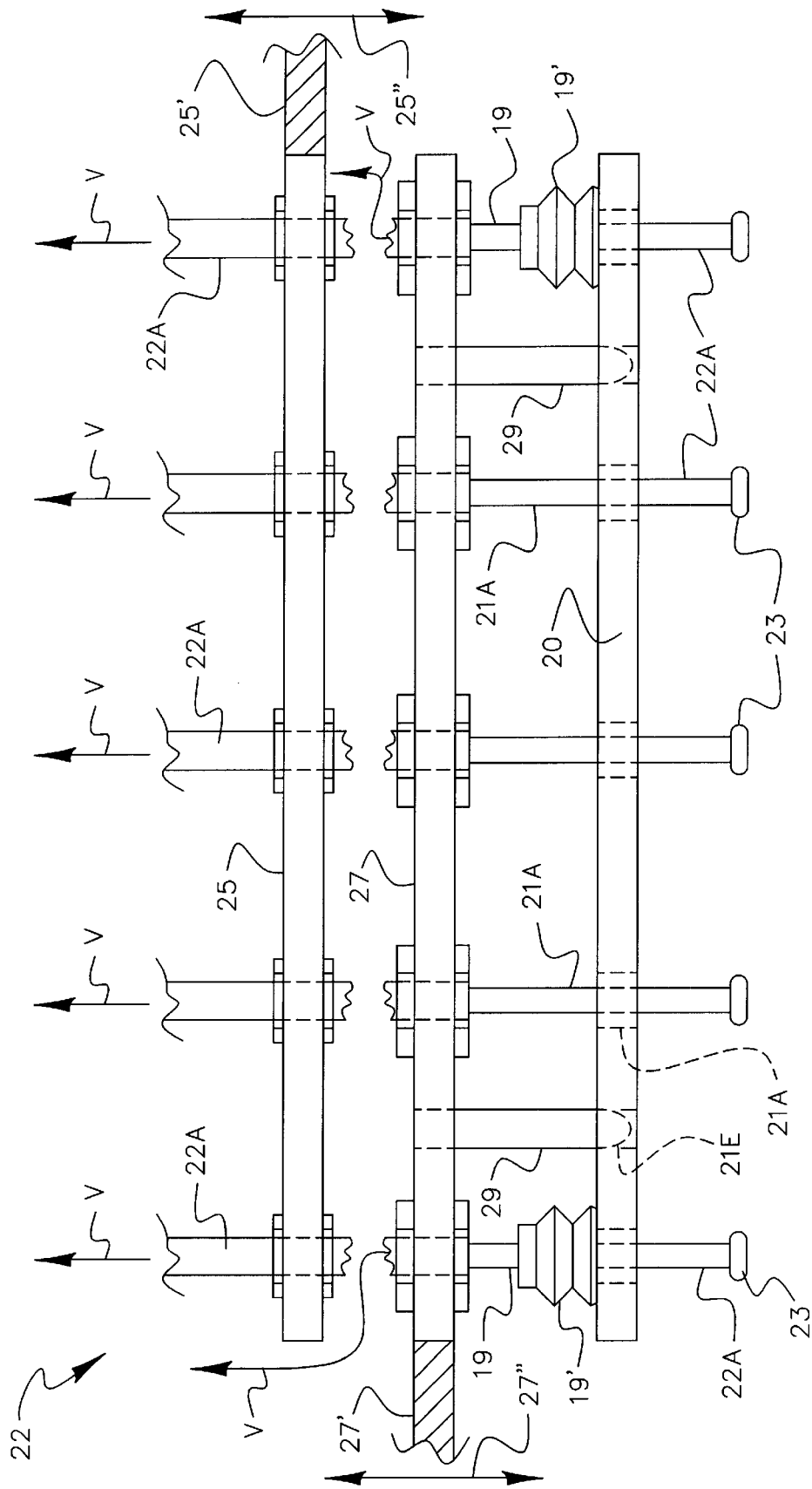
FIG. 8A is a side elevational view with parts in section of the vacuum pick-up head unit holding a pallet cover in the intended manner.
Figure 8B:
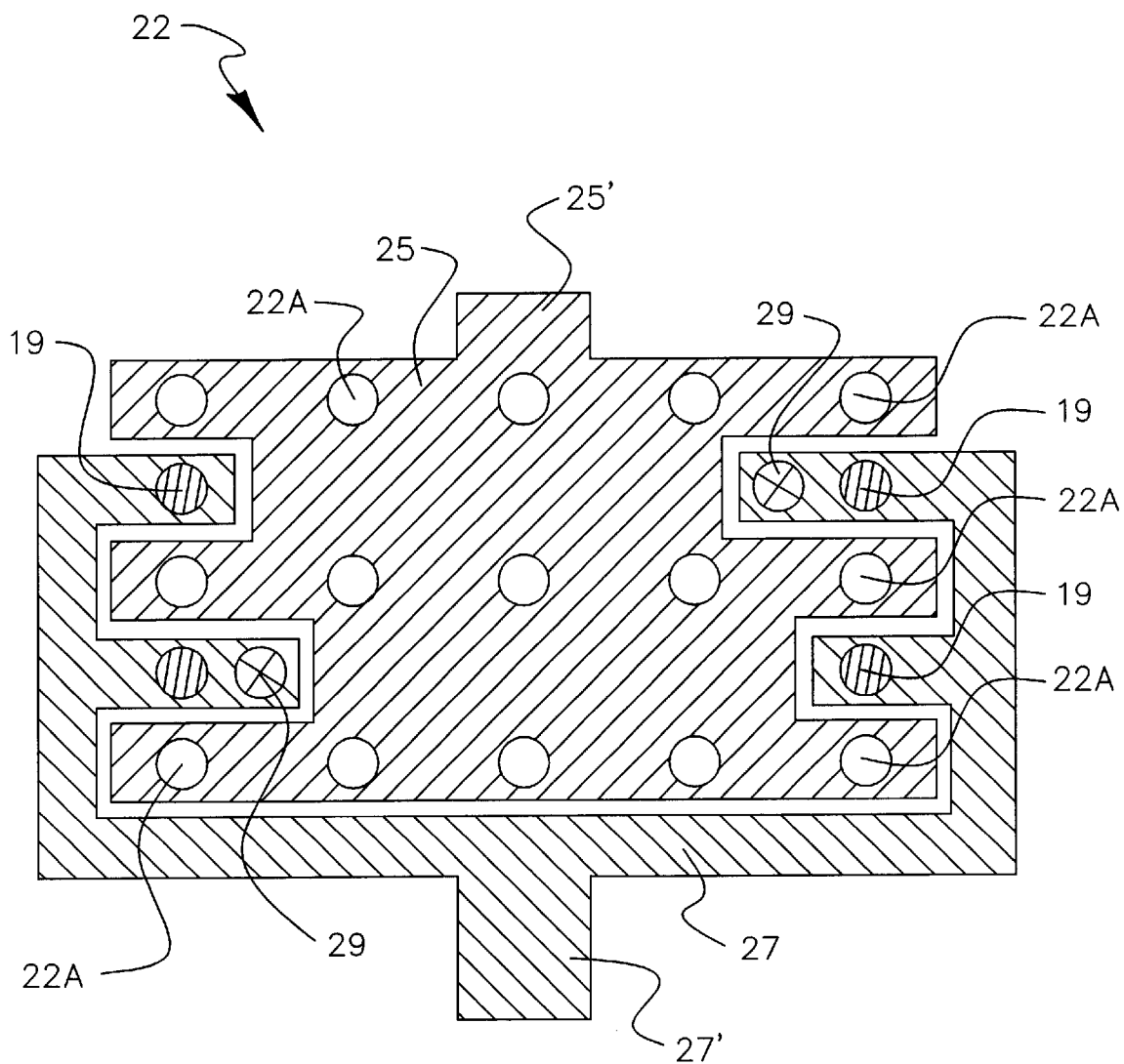
FIG. 8B is a plan view of the plates which carry the vacuum heads for lens pick-up and for pallet cover pick-up.
Figure 10A:
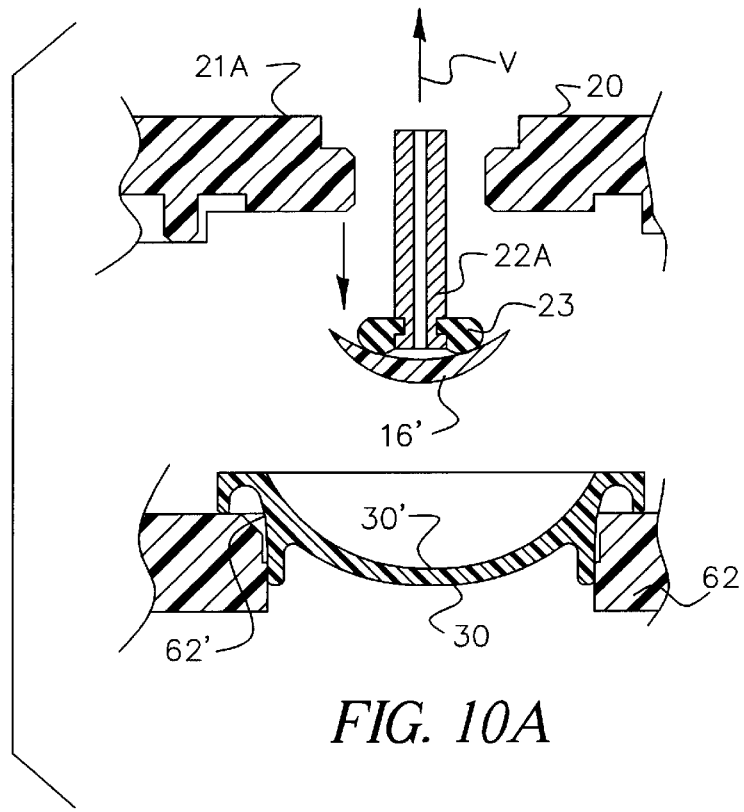
FIGS. 10A and 10B are cross-sectional and perspective views, respectively, of the lens placement station showing the pick-up head and lens immediately prior to release of the lens in a respective lens receptacle.
Figure 10C:
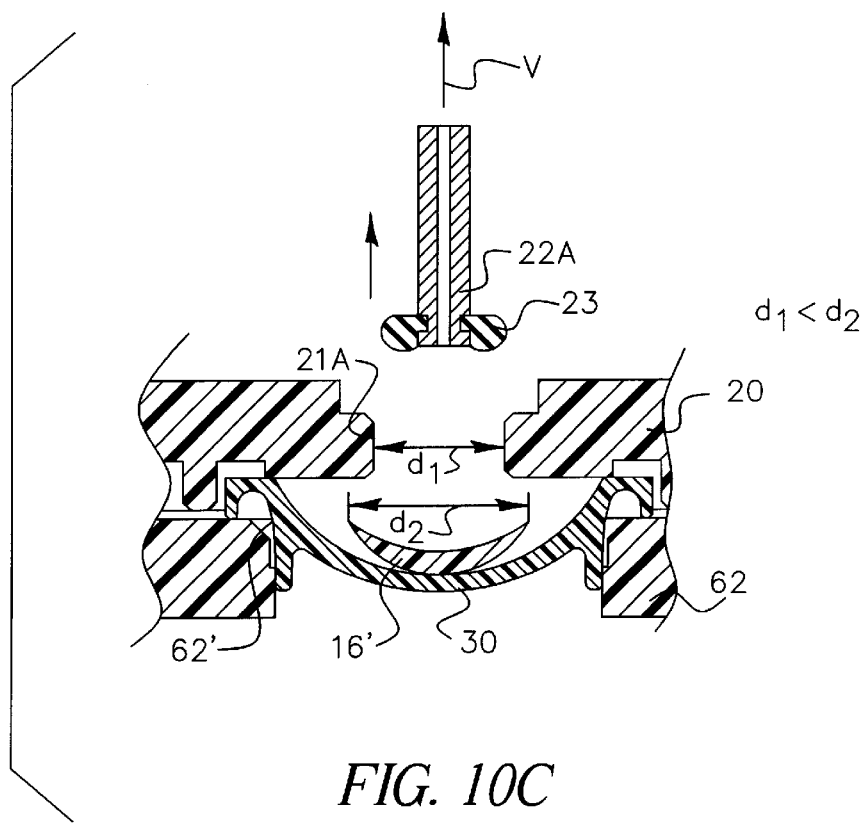
FIGS. 10C and 10D are cross-sectional and perspective views, respectively, of the lens placement station showing the pick-up head being retracted from the pallet cover immediately following release of the lens in the lens receptacle.
Figure 10B:
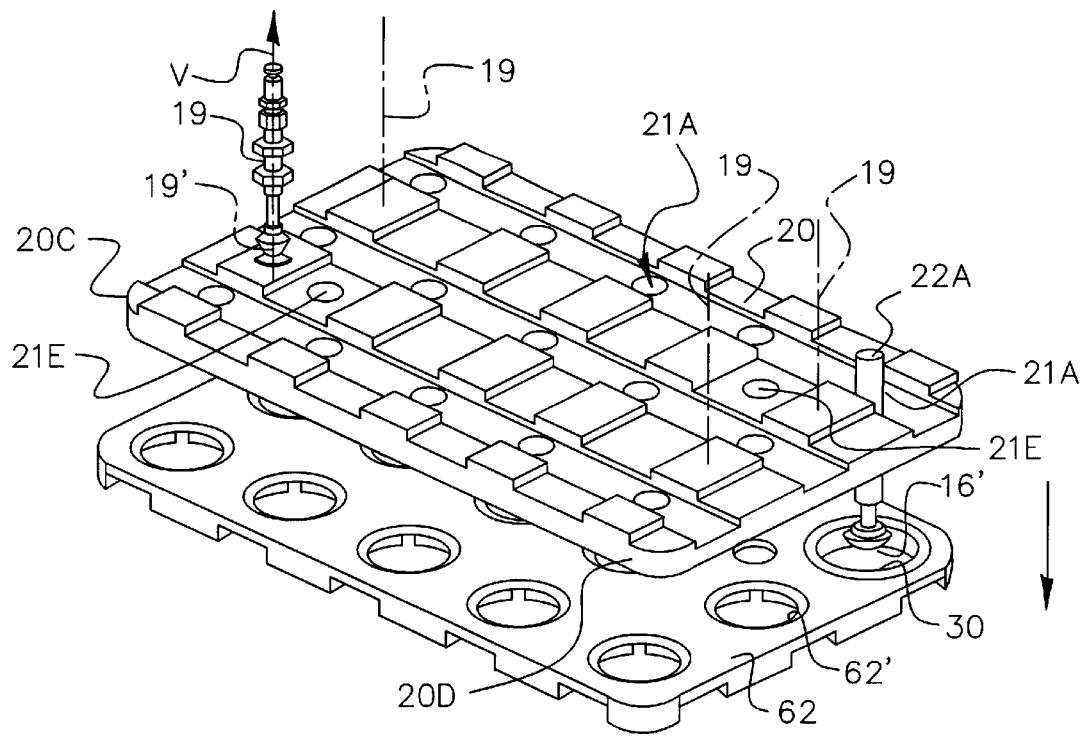
Figure 10D:
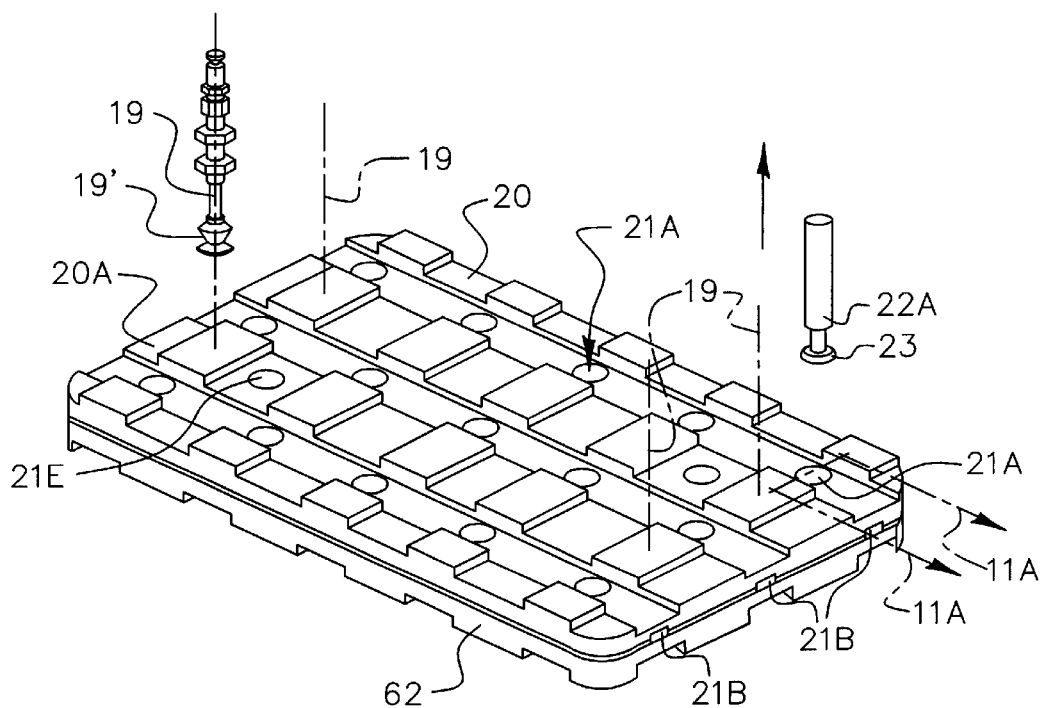

As seen in FIGS. 8A,8B and 10B, the pick-and-place unit 22 includes an array of cover pick-up heads 19 and an array of lens pick-up heads 22A, each of which connect to a vacuum source "V". In the preferred embodiment, the array of lens pick-up heads 22A equal the array of lenses 16' to be picked at station 2, and thus also equal the array of depressions 21 in cover 20. Thus, in the embodiment shown in the figures, an array of fifteen lens pick-up heads 22A are provided which are mounted to and depend from a lens pick plate 25 of the unit 22. Lens pick pate 25 includes a mounting bracket 25' which attaches to a vertical slide (now shown) allowing plate 25 to be alternately lowered and raised over stations 1, 2 and 3 as indicated by directional arrow 25" in FIG. 8A. Similarly, one or more, but preferably four pick-up heads 19 for picking cover 20 are provided and mounted to and depend from a cover pick plate 27 which itself has a mounting bracket 27' which attaches to a vertical slide (now shown) in the pick-and-place unit 22 on a side thereof opposite mounting bracket 25' of lens pick plate 25, thus allowing plate 27 to be alternately lowered and raised over stations 1, 2 and 3 as indicated by arrow 27". As seen best in FIG. 8B, plates 25 and 27 are each configured in a manner allowing for the independent vertical movement of one relative to the other. Furthermore, the meshing yet spaced relationship between the plates 25 and 27 allow for the cover pick-up heads 19 to be positioned between the outer-most lines of three lens pick-up heads 22A. Referring to FIG. 10B, it is seen that four cover pick-up heads 19 (only one being shown in full line drawing for the sake of clarity) engage the top surface 20A between holes 21A adjacent opposite cover side edges 20C and 20D. It is also noted that only one lens pick-up head 22A is shown in FIGS. 10B and 10D for sake of clarity, although an array of 15 lens pick-up heads 22A are provided to extend through a respective hole 21A in pallet cover 20 as mentioned above.

Thus, at station 1, pick-and-place plates 25 and 27 are lowered with each lens pick-up head 22A being aligned with and extending downwardly through a respective hole 21A in cover 20, and cover pick-up heads 19 engaging and gripping (via respective vacuum lines V) top surface 20A of cover 20 (ref. FIGS. 3, 8A,B and 10B,D). To assist in maintaining alignment between the pick-up heads 19 and 22A, and cover holes 21A, one or more alignment holes 21E may be provided in cover 20 through which a respective number of alignment pins 29 mounted on lens pick plate 25 (FIG. 8A) may extend. Once cover pick-up heads 19 have engaged a cover 20 in the manner described, plates 25 and 27 rise together and travel toward station 2 where the lens release and lens pick-up operations will occur.

Figure 5A:
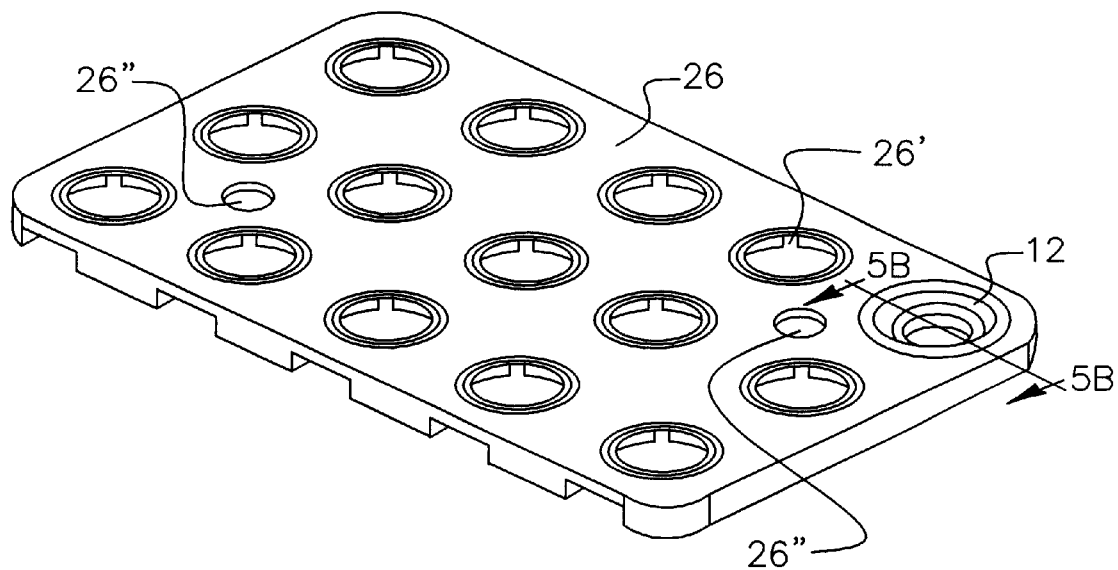
FIGS. 5A is a top perspective view of a female mold section pallet.

Referring again to FIG. 3, a plurality of female mold sections 12 having a respective lens 16' adhered thereto are presented at location 40 for entry into cell 11. In the preferred embodiment, mold sections 12 are the female mold section and are positioned in a predetermined array on a pallet 26 (FIG. 5A), or other suitable support for entry into the cell 11. The array should align with and equal in number the array of depressions 21 in cover 20. Thus, as seen in FIG. 5A, an array of 3×5 of holes 26' are provided in mold pallet 26 in which a total of 15 female mold sections 12 are positioned, respectively. As with covers 20, a plurality of mold pallets 26 together with their respective female mold sections 12 and lenses 16 adhered thereto, may be stacked in a magazine 42 for dispensing, one-at-a-time, into cell 11.

It is noted that the position of the mold section 12 (whether it be the male or female mold section in which the lens is retained) must present the lens 16' in facing relation to the lens pick-up head 22A at station 2. The specific mold separation operation employed, which would occur prior to the lens release and handling operation of the present invention, will typically determine the orientation of the mold sections prior to their entry into the cell 11. Should the mold section present its respective lens 16' in a position which is opposite to that which is required at station 2, the mold sections must be inverted prior to lens pick-up at station 2. A suitable inversion mechanism 44 may be incorporated into cell 11 between magazine 42 and station 2.

Figure 5B:
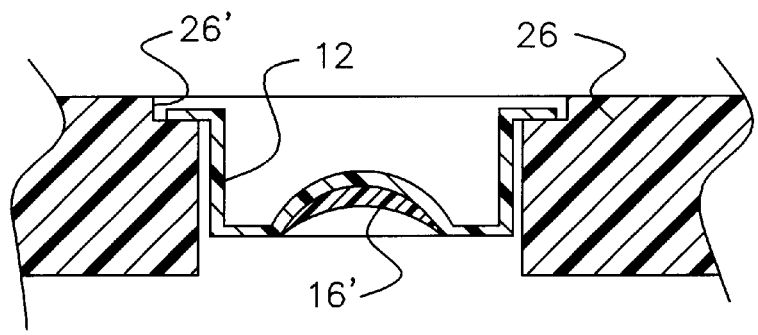
FIG. 5B is a cross-sectional view as taken generally along the line 5B—5B of FIG. 5A.
Figure 6A:
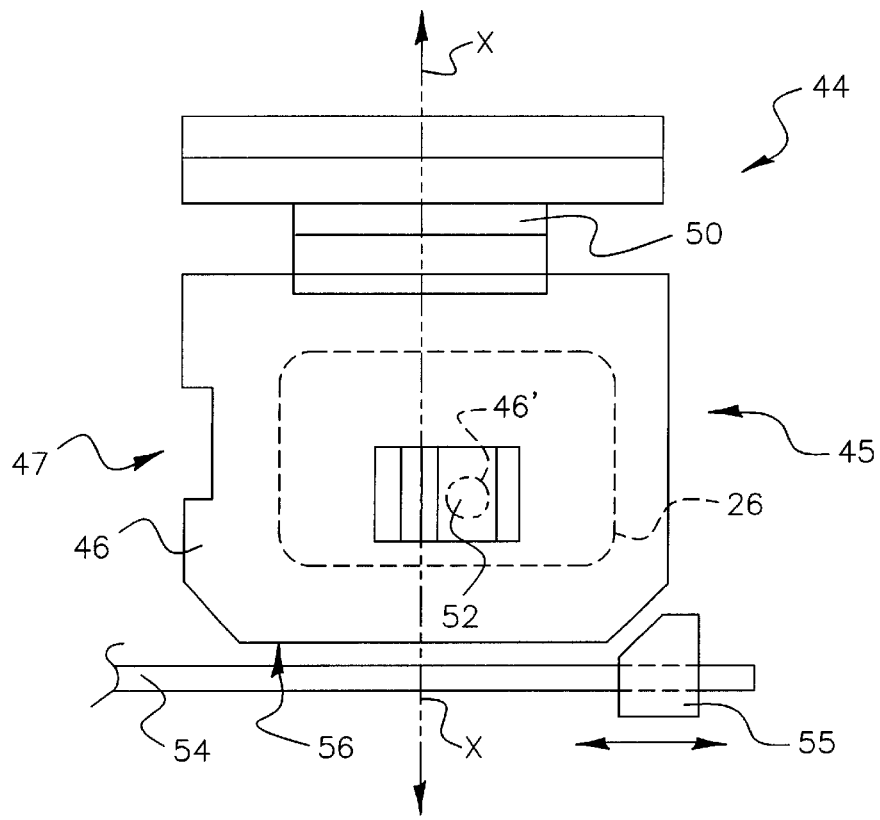
FIG. 6A is a top plan view of the female pallet inversion assembly and FIG. 6B is a side elevational view thereof with parts in section.
Figure 6B:
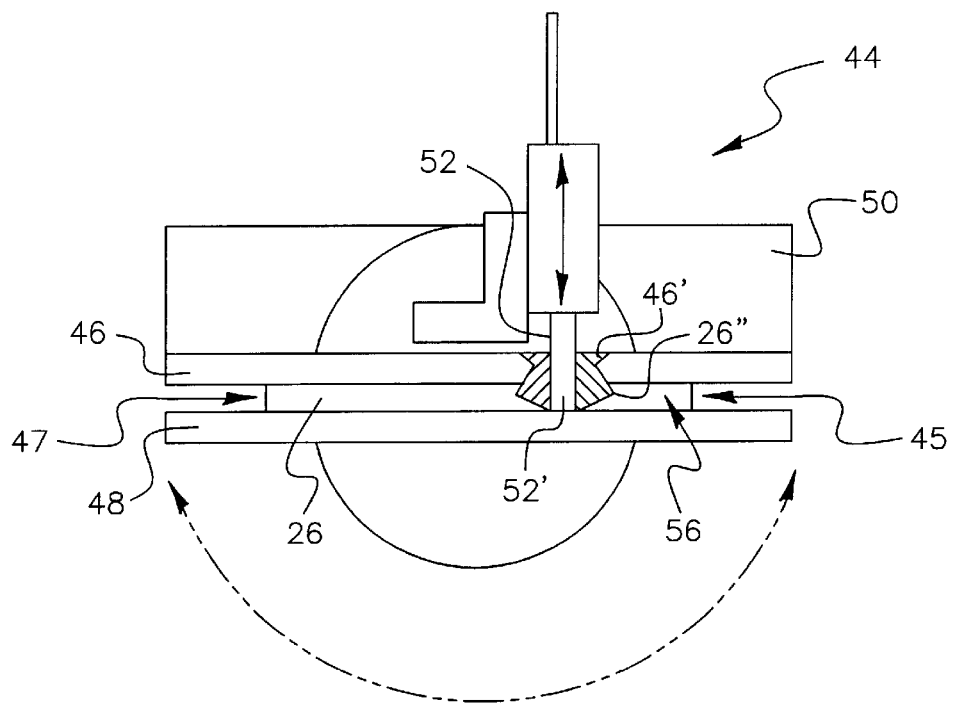
Figure 6C:
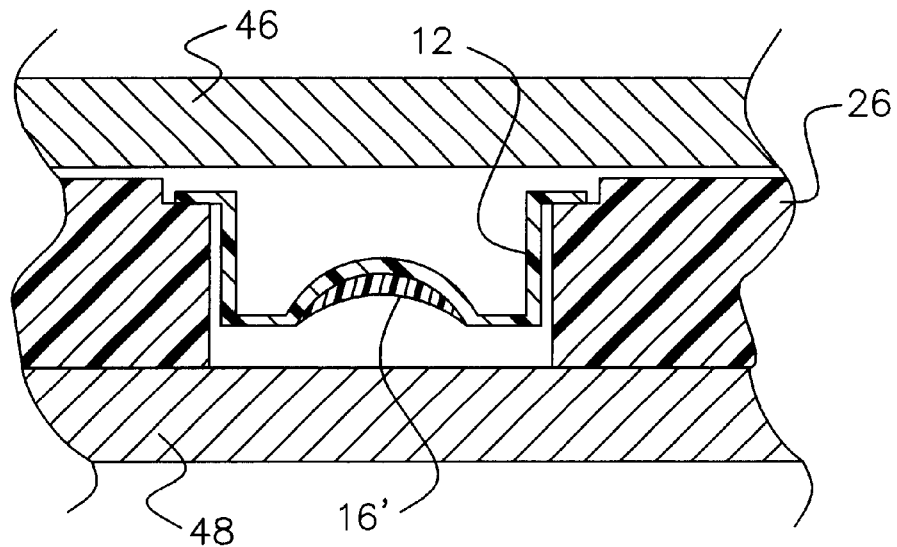
FIGS. 6C and 6D are enlarged, cross-sectional views showing inversion of a female mold section in the female pallet inversion assembly.
Figure 6D:
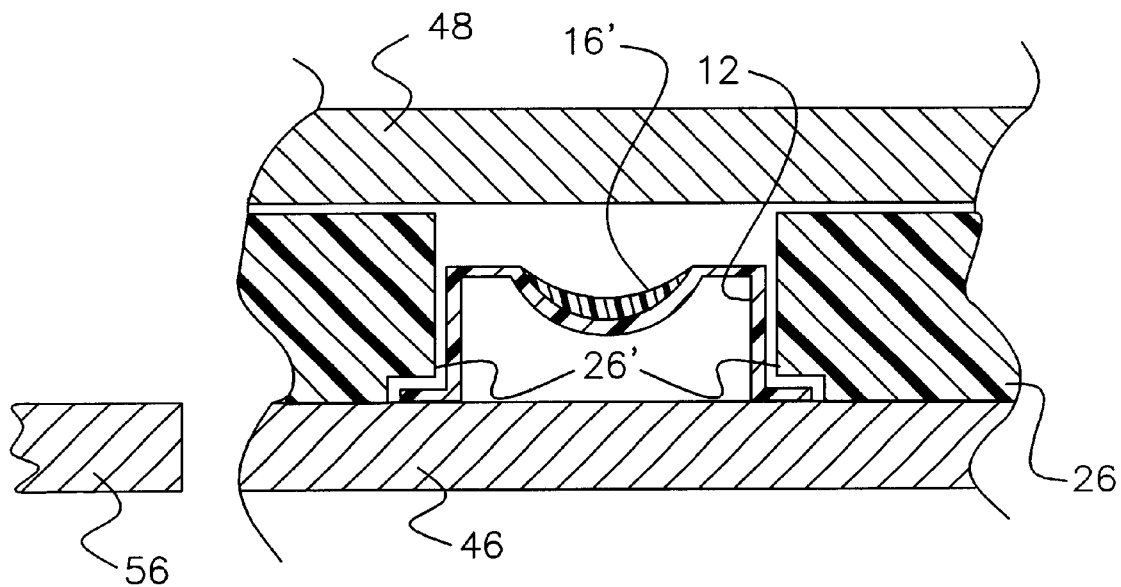
Figure 7A:
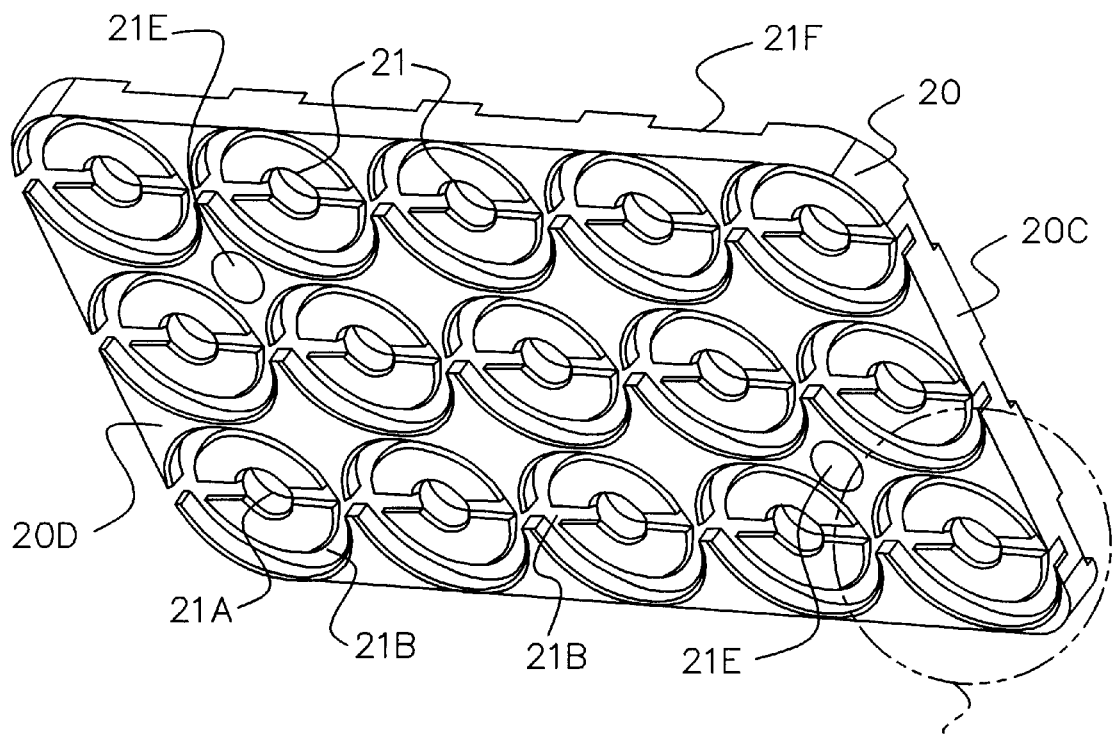
FIG. 7A is a bottom, perspective view of a pallet cover.
Figure 7B:
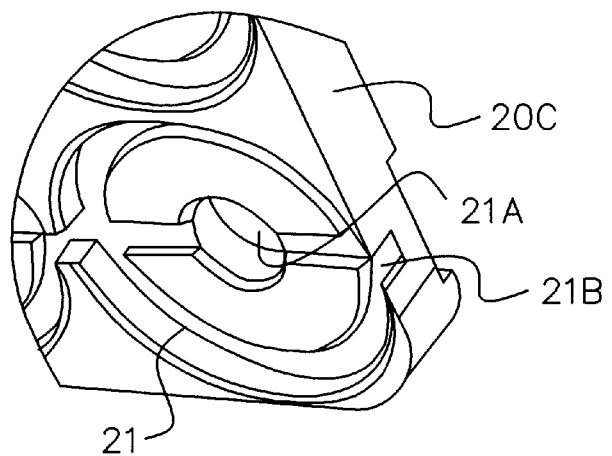
FIG. 7B is an enlarged, detail view of one of the depressions in the pallet cover of FIG. 7A.
Figure 7C:
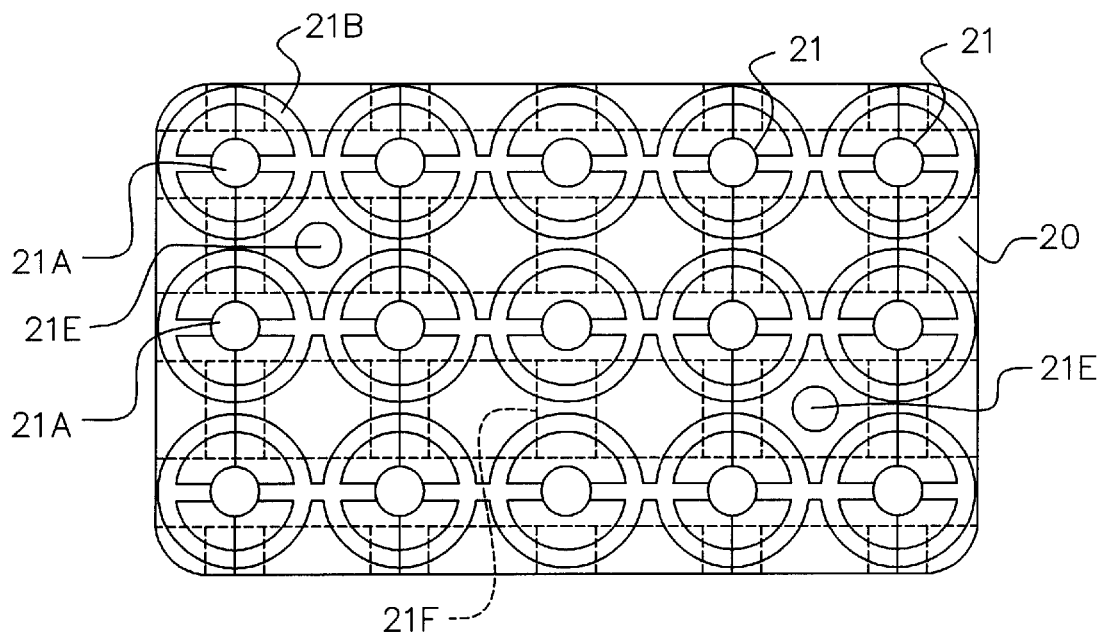
FIG. 7C is a bottom plan view of the pallet cover of FIGS. 7A and 7B.
Figure 7D:
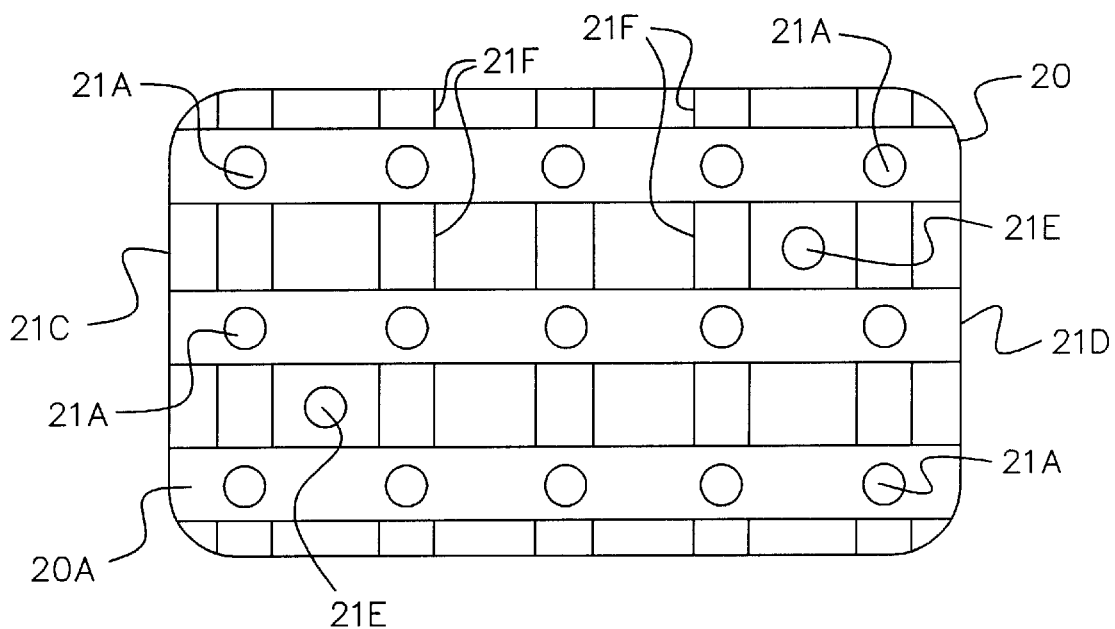
FIG. 7D is a top plan view of the pallet cover.

Referring to FIGS. 6A and 6B, a preferred embodiment of inversion mechanism 44 is shown to comprise a pair of spaced, parallel plates 46 and 48 which are rotatably mounted to a rotation head 50. A pallet 26 with respective mold sections 12 is advanced between plates 46,48 at leading opening 45 thereof. Prior to inversion, a plunger 52 which is mounted to plate 46, is extended through a hole 46' formed in plate 46 with the plunger tip 52' engaging a recess or hole 26" in pallet 26. This acts to prevent pallet 26 from falling from either of the opposite openings 45,47 during rotation of pallet 26 by mechanism 44. Thus, once plunger 52 has engaged pallet 26, rotation head 50 is activated and executes a 180° revolution about axis X—X (FIG. 6A). FIGS. 6C and 6D illustrate mold section 12 before and after inversion between plates 46,48, respectively. Thus, mold section 12 presents lens 16' in a face-down position upon entry into cell 11 as seen in FIGS. 5A and 5B. Since the lens pick-up head 22A would be located opposite lens 16' in this orientation, the mold section 12 is inverted by mechanism 44 to present lens 16' in a face-up position as seen in FIGS. 6D and 9A–C.

As previously noted, it is understood that inversion is only necessary when the mold section presents the lens in a position which does not face the lens pick-up mechanism. Once inversion is complete, pallet 26 with mold sections 12 exit the inversion mechanism 44 and advance to station 2. This may be accomplished with a linear actuator 54 (FIG. 6A) having a finger 55 which travels along the side opening 56 defined between plates 46,48 (FIG. 6B), thereby pushing pallet 26 to exit from between plates 46,48. In the pallet and mold section configuration shown herein, once pallet 26 has been inverted to the position shown in FIG. 6D, pallet 26 will no longer support a mold section 12 which, absent other support means, would fall out of a respective hole 26'. As such, it is important that the mold sections 12 are supported as pallet 26 exits plates 46,48 and travels to station 2. This may be accomplished by providing a support surface 56 at the exit location of pallet 26 which lies closely adjacent and substantially flush to plate 46 (see also FIGS. 9A–D where support 56 extends to station 2).

Referring now to FIGS. 9A–D, the lens release and pick-up operation at station 2 will now be described. A second top plate 58 is provided in spaced, parallel relation to support plate 56 between which pallet 26 is advanced with respective mold sections 12 from inversion mechanism 44 in the manner described above. The spacing between plates 56,58 is preferably slightly greater than the total height of a mold section 12 and associated pallet 26 such that pallet 26 and mold sections 12 may freely slide between plates 56,58.

Top plate 58 includes a plurality of through-holes 58' which are positioned in a predetermined array which aligns with the array of mold sections 12 upon the complete advancement of pallet 26 between plates 56,58. With pallet 26 in this position, lens pick-up heads 22A, which are also aligned with holes 58', descend to extend through a respective hole 58'. Cover pick plate 27 is also lowered so that cover 20 comes to rest upon top plate 58. As explained more fully later, holes 21A are of a smaller diameter than the lens 16'. Thus, placing cover 20 upon top plate 58 during lens release and pick-up prevents lens 16' from unintentionally passing through (fly-away) hole 58' prior to lens pick-up by pick-up head 22A.

At about the same time, pins 28 located beneath support plate 56 are raised to extend through holes 56' in support plate 56 to engage the non-optical surface 12D of a respective mold section 12 (FIG. 9B). In the preferred embodiment, an array of pins 28 are provided which are equal in number and align with the array of mold sections 12 in pallet 26. Each pin 28 has an engagement surface 28' which rises to meet mold surface 12D in a direction substantially normal thereto and in a location which is substantially at the center of the mold surface 12D. The pin 28 is applied to a respective mold surface 12D with the pin 28 being extended a predetermined distance such that the mold surface 12D will deform by an amount sufficient to safely release the lens 16' from the optical surface 12A of the mold section. For the mold configuration illustrated herein, it was found that a pin extension which results in about 0.9 mm of mold deflection was sufficient to consistently and safely release the lens 16' from the optical surface 12A of the mold section 12. The amount of pin extension will of course depend on the initial positioning and length of the pin 28 utilized. It is also understood that the amount of mold deflection necessary to effectuate a safe release of the lens will also depend on the particular mold configuration and materials used, as well as the type of lens being molded. These factors must be taken into consideration when determining the nominal amount of mold deflection to safely release the lens.

While the amount of mold deflection is deemed to be the primary parameter of concern for safe lens release from the mold section, pin force and duration of engagement are also important parameters to consider. In the embodiment shown and described herein, it was found that a pin force of approximately 300–500 newtons, and more preferably about 400 newtons, for a duration of approximately 500 ms (⁺/−)200 ms was sufficient to safely release lens 16' from mold surface 12A. It is also noted that both force and engagement time may need to be adjusted depending on the particular mold configuration and material employed.

Once lens 16' has released from mold surface 12A, it is picked up by pick-up head 22A through suction forces generated by vacuum source "V". As mentioned above, lens pick-up head 22A may be provided with a protective tip 23 to prevent damage to lens 16' as it is being handled by the pick-up head. Protective tip 23 may be in the form of a rubber O-ring fit into an annular groove adjacent tip 22B.

Referring to FIG. 9B, the sequence of part movements to release and pick a lens is as follows. Pick-up heads 22A, which are each preferably spring-loaded to provide a cushioning effect, are lowered to extend through a respective hole 58' in top plate 58 until the pick-up tip 23 just touches a respective lens 16' in its associated mold section 12. To ensure correct alignment of the array of mold sections 12 beneath the respective array of holes 58', a pair of alignment pins (not shown) are provided to ride together with the array of pins 28 and extend through the alignment holes 26" provided in pallet 26 (FIG. 5A). Thus, once pick-up tips 23 have lowered to touch a respective lens 16', the stroke of pins 28 is activated to engage the non-optical surface 12D of a respective mold section 12. The pin 28 extends against a respective mold surface 12D and acts to press the annular flat section 12E of the mold section against the surface 58" which surrounds a respective through-hole 58' in upper plate 58. This provides an even force about the perimeter of the mold section 12 during the lens release operation performed by pin 28, thereby preventing damage to the lens which could occur if the force applied to surface 12D was not evenly distributed across the surface. It is thus preferred that engaging surface 58" be carefully machined to ensure a substantially planar surface for engagement by the annular flat sections 12E of an associated mold section 12.

Once pick-up head 22A has engaged lens 16', pick-up head 22A is raised and withdrawn from a respective hole 58' in top plate 58. Pin 28 is then retracted. It is noted that pin 28 should remain engaged with the mold surface 12D during the lens pick-up by head 22A. This is because the deflection of the mold caused by the engagement with pin 28 may relax to its non-deformed, original position. Should this happen, it may prove difficult to pick the lens 16' with a respective pick-up head 22A since the concavity of the optical surface 12A tends to "pull" the lens back toward surface 12A and resist release.

As seen best in FIG. 9B, the diameter of hole 58' is large enough to allow free passage of pick-up head 22A and an adhered lens 16' therethrough, yet small enough to engage and prevent passage of a respective mold section 12 therethrough. Once the pick-up heads 22A have raised clear of top plate 58, pick-and-place unit 22 continues travel along rail 24 to station 3. A vacuum sensor (not shown) may be incorporated along each pick-up head vacuum line to sense whether or not a lens 16' has been picked up by a respective pick-up head 22A, and also whether or not a cover 20 has been picked up by cover pick-up heads 19. If either a "no cover" or a "no lens" situation is detected, a signal is sent by the sensor to the computer controls to notify the operator.

Figure 9D:
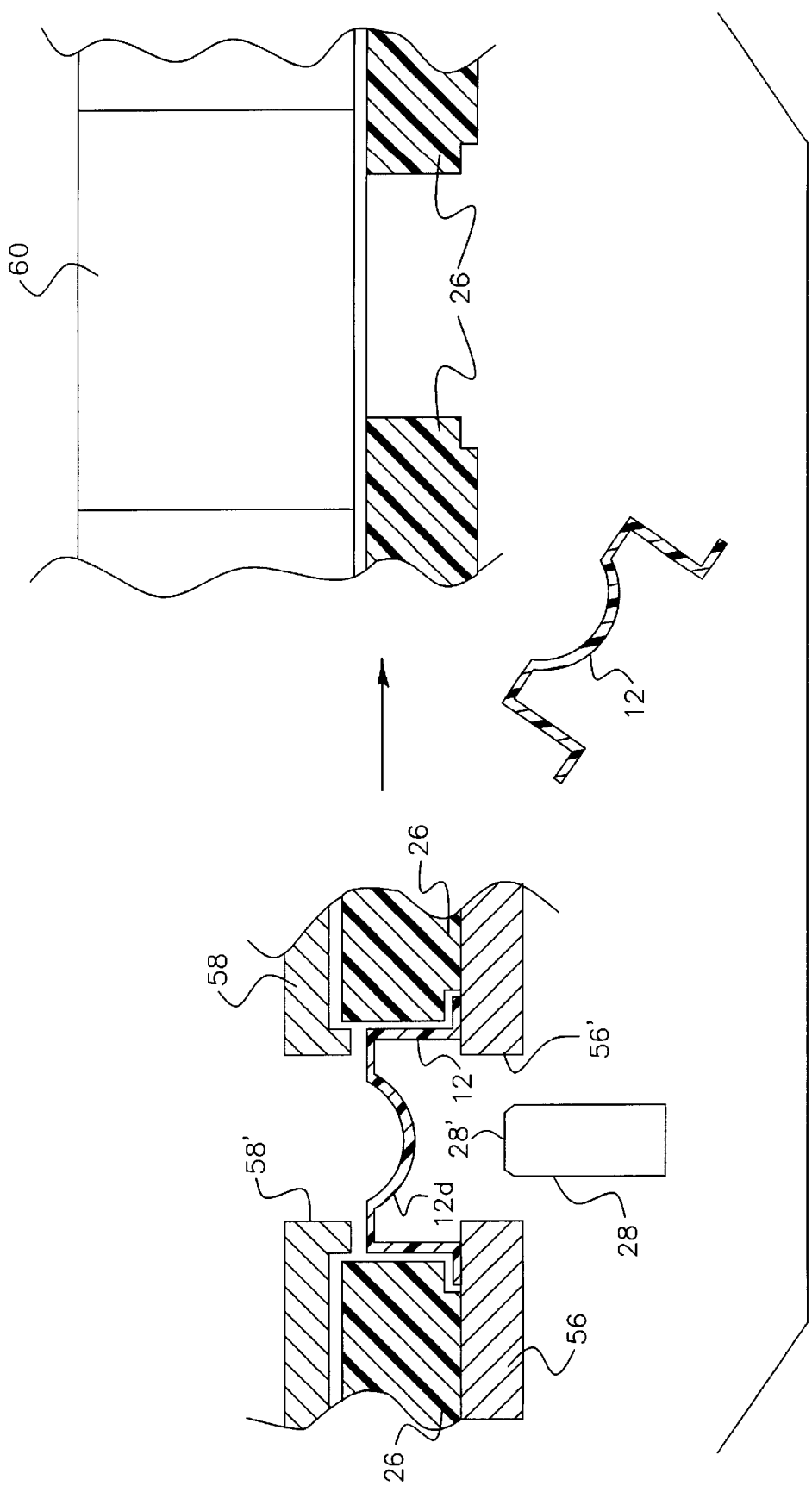
FIG. 9D is a fragmented, cross-sectional view showing an empty female mold section after the lens has been picked therefrom, and the discard of the female mold section together with advancement and exit of the empty female mold pallet from the cell.

Prior to discussing station 3 in detail, attention is turned to FIGS. 3 and 9D which illustrate exit of pallet 26 from plates 56,58 and release of the now empty mold sections 12 from pallet 26. As stated in the Background section, the molds in which the lenses are cast are used only once and then recycled due to degradation of the optical surfaces. On the other hand, pallets 26 may be re-used. Thus, a magazine 60 may be provided into which the empty pallets 26 are advanced from between plates 56,58. An open space is provided between plates 56,58 and the magazine 60 such that the empty mold sections 12 will fall from their respective holes 26' as pallet 26 is advanced into magazine 60 (FIG. 9D). A recycling bin (not shown) may be positioned to catch the mold sections 12 as they fall from pallet 26 in this manner. Once full, magazine 60 may be transported to place the empty pallets 26 back into the rotating pallet stock and replaced by an empty magazine 60 at station 2.

Discussion is now turned to the lens deposit operation of station 3. Referring to FIGS. 3 and 10A–D, a plurality of pallets 62 are provided for entry into cell 11 at location 64 (FIG. 3). Each pallet 62 includes an array of holes 62' wherein a respective array of lens receptacles 30 are positioned. It is preferred that the array of receptacles 30 in pallet 62 are aligned with and the same in number as the array of pick-up heads 22A and lenses 16' carried thereon. Pallets 62 may be stacked in a magazine 66 for entry into cell 11 at location 64. Each hole 62' of pallet 62 is thus populated with a respective lens receptacle 30, preferably prior to entry into cell 11 and stacking into magazine 66.

Means are provided for sequentially advancing pallets 62 from magazine 66 to station 3, which advancing means may take the form of the other mechanisms described herein for advancing cover 20 and mold pallets 26. Once a pallet 62 and respective lens receptacles 30 is advanced to station 3, pick-up heads 22A are lowered to release lens 16' in a respective receptacle 30 and release cover 20 thereon.

More particularly, as seen in FIGS. 10A, 10B, the pick-up heads 22A, together with cover 20 and lens 16' on tip 23, are lowered over a respective lens receptacle 30 until the lens 16' is spaced slightly above the concave surface 30' of a respective receptacle 30, and cover 20 lies in close covering relation to pallet 62. Vacuum source "V" on lens pick-up head 22A is released, thereby releasing lens 16' which gently falls to surface 30' of receptacle 30. Pick-up head 22A is then retracted, leaving lens 16' in well 30'. Immediately after release of lens 16', the vacuum lines on the lens pick-up heads 22A and cover pick-up heads 19 are relieved and the lens and cover pick-up heads 19, 22A are raised, thereby leaving cover 20 on pallet 62 (FIGS. 10C, 10D).

As seen in FIG. 10C, the diameter $d_1$ of hole 21A in pallet cover 20 is larger the outer diameter of the pick-up head 22A and tip 23 to permit pick-up head 22A to extend freely therethrough, yet is smaller than the outer diameter $d_2$ of lens 16' whereby lens 16' cannot pass through hole 21A. In this way, cover 20 has positively captured each lens 16' in a respective receptacle well 30' prior to the vacuum "V" on each head 22A being relieved to release associated lenses 16' into an associated receptacle 30. It will thus be appreciated that the cooperative features and operation of the cover and lens pick-up head 19,22A, respectively, pallet cover 20 and receptacles 30 act to substantially prevent any chance of lens fly-away.

Figure 11A:
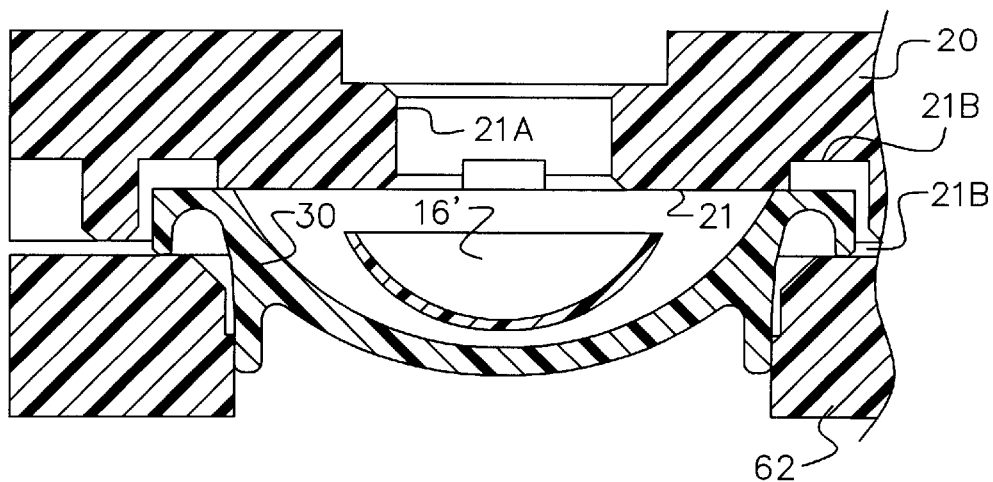
FIG. 11A is a cross-sectional view as taken along the line 11A—11A in FIG. 10D.
Figure 11B:
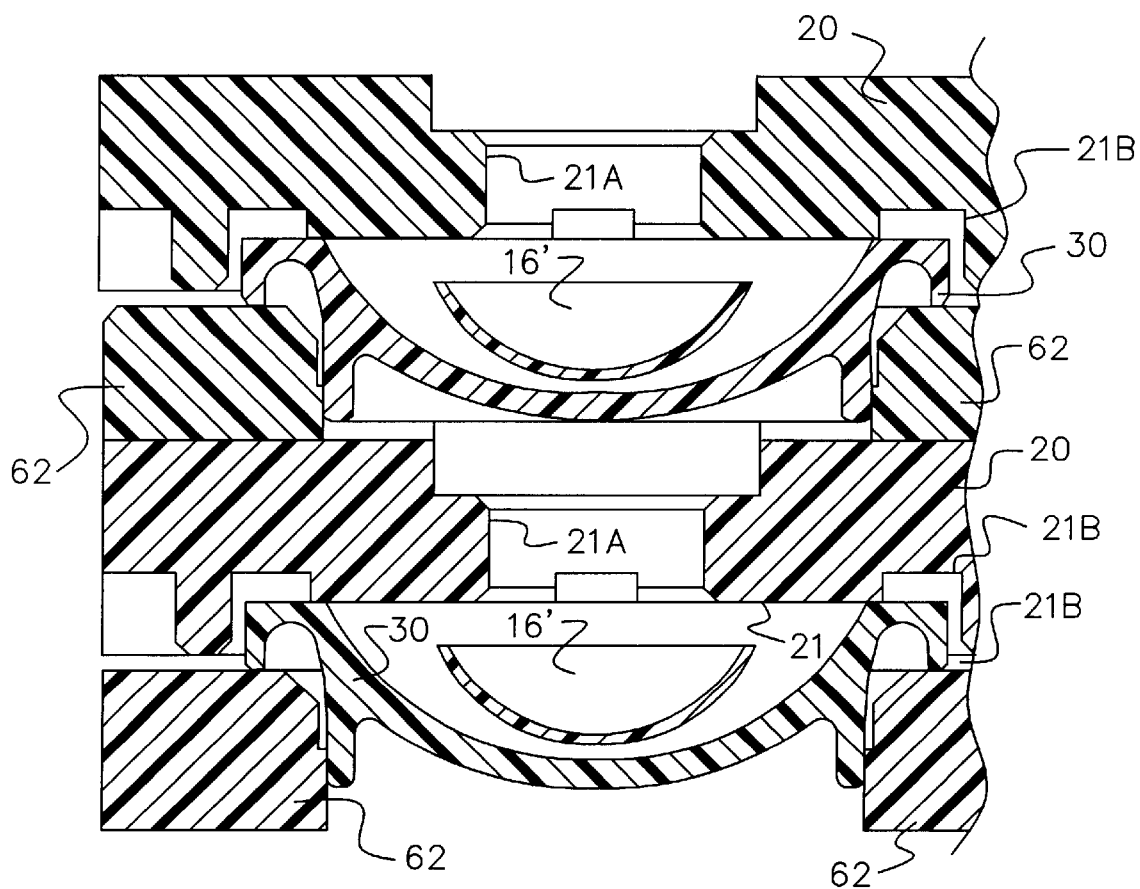
FIG. 11B is a view similar to FIG. 11A and further including a second lens receptacle, associated pallet and pallet cover stacked upon the lens receptacle pallet and pallet cover of FIG. 11A.

Referring to FIGS. 11A,B, the unit comprising a pallet 62, receptacles 30 with respective lenses 16' and cover 20, can be stacked one unit upon another as the units exit station 3 and exit the cell 11 for further downline processing. The stacked units may be placed into a magazine 70 (FIG. 3) for transport to downline process stations (not shown). For example, in the preferred embodiment, cover 20 acts as a hydration cover during hydration of lenses 16' to prevent the lenses 16' from escaping their respective receptacles 30 during hydration. Hydrating fluid may enter between cover 20 and pallet 62 through continuous grooves 21B formed in the cover bottom surface 20D facing pallet 30 (see also FIGS. 7A–C and 10D). This configuration thus provides an efficient method for handling a multitude of lenses through a wet process step (e.g., hydration, extraction, sterilization) at a time.

What is claimed is:

1. A method for picking a lens from a first location and transferring the picked lens to a receptacle and applying a cover to said receptacle with said lens located within and confined to the receptacle by the cover, said method comprising the steps of:

a) providing lens picking means for releasably picking said lens from said first location;

b) releasably coupling said cover to said lens picking means such that said cover is moveable with said picking means as said picking means moves away from said first location;

c) moving said lens picking means, said lens, and said cover to a position adjacent said receptacle;

d) releasing said lens from said lens picking means and depositing said lens in said receptacle; and e) releasing said cover from said lens picking means and depositing said cover over said receptacle, thereby confining said lens to said receptacle.

2. The method of claim 1 wherein said lens is dry and said lens picking means is a vacuum picker head.

3. The method of claim 1 wherein said receptacle is a blister package.

4. The method of claim 1 wherein said first location comprises a mold section in which said lens is located and picked with said lens picking means.

5. The method of claim 4 wherein said mold section includes a lens molding surface against which said lens was molded, said mold section further including a non-molding surface located opposite said molding surface.

6. The method of claim 5 wherein, prior to being picked, said lens is adhered to said lens molding surface of said mold section, and wherein said method further comprises the step of providing lens releasing means for releasing said lens from said lens molding surface prior to said lens being picked by said lens picking means.

7. The method of claim 6 wherein said lens releasing means comprises applying a force against said non-molding surface of said mold section.

8. The method of claim 7 wherein said force is applied with a pin.

9. The method of claim 8 wherein said pin causes a deformation of said non-molding surface, thereby breaking the adhesion between and releasing said lens from said lens molding surface.

10. The method of claim 9 wherein said lens is dry and said lens picking means is a lens vacuum pick-up head.

11. The method of claim 10 wherein said lens vacuum pick-up head extends through a hole in said cover when in coupling engagement therewith, said lens vacuum pick-up head withdrawing from said hole subsequent to placement of said cover over said receptacle.

12. The method of claim 11 wherein said hole in said cover has a diameter larger than the diameter of the portion of said vacuum pick-up head which extends therethrough, said hole diameter being smaller than the outer diameter of said lens to prevent passage of said lens through said hole in said cover.

13. Apparatus for picking a lens from a first location and transferring the picked lens to a receptacle and applying a cover to said receptacle with said lens located within and confined to the receptacle by the cover, said apparatus comprising:
   a) lens picking means for releasably picking said lens from said first location;
   b) means for releasably coupling said cover to said lens picking means such that said cover is moveable with said picking means as said picking means moves away from said first location;
   c) means for moving said lens picking means, said lens, and said cover to a position adjacent said receptacle;
   d) means for releasing said lens from said lens picking means and depositing said lens in said receptacle; and
   e) means for releasing said cover from said lens picking means and depositing said cover over said receptacle, thereby confining said lens to said receptacle.

14. The apparatus of claim 13 wherein said lens is dry and said lens picking means is a vacuum pick-up head.

15. The apparatus of claim 13 wherein said receptacle is a blister package.

16. The apparatus of claim 13 wherein said first location comprises a mold section in which said lens is located and picked with said lens picking means.

17. The apparatus of claim 16 wherein said mold section includes a lens molding surface against which said lens was molded, said mold section further including a non-molding surface located opposite said molding surface.

18. The apparatus of claim 17 wherein, prior to being picked, said lens is adhered to said lens molding surface of said mold section, and wherein said apparatus further comprises lens releasing means for releasing said lens from said lens molding surface prior to said lens being picked by said lens picking means.

19. The apparatus of claim 18 wherein said lens releasing means comprises applying a force against said non-molding surface of said mold section.

20. The apparatus of claim 19 wherein said force is applied with a pin.

21. The apparatus of claim 20 wherein said pin causes a deformation of said non-molding surface, thereby breaking the adhesion between and releasing said lens from said lens molding surface.

22. The apparatus of claim 21 wherein said lens is dry and said lens picking means is a lens vacuum pick-up head.

23. The apparatus of claim 22 wherein said lens vacuum pick-up head extends through a respective hole in said cover when in coupling engagement therewith, said lens vacuum pick-up head withdrawing from said hole subsequent to placement of said cover over said receptacle.

24. The apparatus of claim 11 wherein said hole in said cover has a diameter larger than the diameter of the portion of said vacuum pick-up head which extends therethrough, said hole diameter being smaller than the outer diameter of said lens to prevent passage of said lens through said hole in said cover.

* * * * *